(12) United States Patent
Berkland et al.

(10) Patent No.: US 8,372,786 B2
(45) Date of Patent: Feb. 12, 2013

(54) POLYELECTROLYTE COMPLEXES FOR OIL AND GAS APPLICATIONS

(75) Inventors: Cory Berkland, Lawrence, KS (US); Mary Cordova, Lawrence, KS (US); Jenn-Tai Liang, Lawrence, KS (US); G. Paul Willhite, Lawrence, KS (US)

(73) Assignee: University of Kansas, Lawrence, KS (US)

( * ) Notice: Subject to any disclaimer, the term of this patent is extended or adjusted under 35 U.S.C. 154(b) by 0 days.

(21) Appl. No.: 12/564,510

(22) Filed: Sep. 22, 2009

(65) Prior Publication Data
US 2010/0056399 A1 Mar. 4, 2010

Related U.S. Application Data

(62) Division of application No. 11/515,580, filed on Sep. 5, 2006, now Pat. No. 8,183,184.

(51) Int. Cl.
*C04B 33/04* (2006.01)
*C09K 8/68* (2006.01)
*E21B 37/00* (2006.01)
*E21B 43/16* (2006.01)

(52) U.S. Cl. ......... 507/90; 507/211; 507/224; 507/902; 166/304; 166/305.1

(58) Field of Classification Search .............. 507/90, 507/211, 224, 902; 166/304, 305.1
See application file for complete search history.

(56) References Cited

U.S. PATENT DOCUMENTS

| | | | | |
|---|---|---|---|---|
| 3,629,105 A | * | 12/1971 | Weiss | 507/207 |
| 3,932,296 A | * | 1/1976 | Byth | 507/240 |
| 4,324,298 A | * | 4/1982 | Fox | 507/140 |
| 4,773,481 A | | 9/1988 | Allison et al. | |
| 5,922,652 A | * | 7/1999 | Kowalski et al. | 507/129 |
| 6,103,772 A | | 8/2000 | Sydansk | |
| 6,172,010 B1 | * | 1/2001 | Argillier et al. | 507/102 |
| 6,196,317 B1 | | 3/2001 | Hardy | |
| 6,365,066 B1 | | 4/2002 | Podszun et al. | |
| 6,387,986 B1 | | 5/2002 | Moradi-Araghi et al. | |
| 6,645,525 B1 | * | 11/2003 | Woiszwillo | 424/460 |
| 6,726,934 B1 | | 4/2004 | Prokop | |
| 6,908,888 B2 | | 6/2005 | Lee et al. | |
| 2002/0149656 A1 | * | 10/2002 | Nohr et al. | 347/95 |
| 2002/0159952 A1 | | 10/2002 | Unger | |
| 2004/0014073 A1 | | 1/2004 | Trau et al. | |
| 2004/0224024 A1 | | 11/2004 | Kamiya et al. | |
| 2004/0265603 A1 | | 12/2004 | Schlenoff | |
| 2005/0029117 A1 | * | 2/2005 | Mabrouk | 205/413 |
| 2005/0158390 A1 | * | 7/2005 | Rana et al. | 424/489 |
| 2005/0266090 A1 | | 12/2005 | Prokop et al. | |
| 2006/0160122 A1 | | 7/2006 | Harrold et al. | |
| 2008/0058229 A1 | | 3/2008 | Berkland et al. | |
| 2008/0269083 A1 | | 10/2008 | Argillier et al. | |

FOREIGN PATENT DOCUMENTS

| | | |
|---|---|---|
| FR | 2 881 787 A1 | 2/2005 |
| WO | WO 02/12674 A1 | 2/2002 |
| WO | WO 2004/016906 | 2/2004 |
| WO | WO 2004016906 A1 * | 2/2004 |
| WO | WO 2007/002690 A2 | 1/2007 |

OTHER PUBLICATIONS

Tiyaboonchai, J. Pharm Sci. vol. 90, p. 902-914, Jul. 2001.*
Article—Tiyaboonchai, W. et al., *Formulation and Characterization of Amphotericin B-Polyethylenimine-Dextran Sulfate Nanoparticles*, Journal of Pharmaceutical Sciences 90, 902-914 (2001).
Article—Tiyaboonchai, W. et al., *Insulin containing polyethylenimine-dextran sulfate nanoparticles*, International Journal of Pharmaceutics 225, 139-151 (2003) [abstract].
Extended European Search Report; dated Jul. 19, 2010; 7 pages.

* cited by examiner

*Primary Examiner* — Ling Choi
*Assistant Examiner* — Aiqun Li
(74) *Attorney, Agent, or Firm* — Stinson Morrison Hecker LLP (57) ABSTRACT

A polyelectrolyte complex for the controlled release of an oil and gas field chemical selected from the group consisting of (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a breaking agent, and a surfactant.

77 Claims, 2 Drawing Sheets

POLYELECTROLYTE COMPLEXES FOR OIL AND GAS APPLICATIONS

CROSS-REFERENCE TO RELATED APPLICATIONS

This application is a divisional of U.S. patent application Ser. No. 11/515,580, filed on Sep. 5, 2006, which is hereby incorporated herein by reference.

STATEMENT REGARDING FEDERALLY SPONSORED RESEARCH OR DEVELOPMENT

Not applicable.

BACKGROUND OF THE INVENTION

1. Field of the Invention

This present invention relates to compositions and processes for oil and gas field applications. More specifically, this invention relates to compositions useful for controlling and/or delaying the release of various oil or gas field chemicals, including but not limited to (a) gel-forming or cross-linking agents, (b) scale inhibitors, (c) corrosion inhibitors, (d) inhibitors of asphaltene or wax deposition, (e) hydrogen sulfide scavengers, (f) hydrate inhibitors, (g) breaking agents, and (h) surfactants.

2. Description of Related Art

It is well known to those skilled in the art that certain polymers and other compounds are useful in oil and gas field operations. Such oil and gas field chemicals include (a) gel-forming or cross-linking agents, (b) scale inhibitors, (c) corrosion inhibitors, (d) inhibitors of asphaltene or wax deposition, (e) hydrogen sulfide scavengers, (f) hydrate inhibitors, (g) breaking agents, and (h) surfactants.

In many instances, it is desirable to alter the kinetics of the release of such oil and gas field chemicals, i.e., by providing a composition that provides for controlled or delayed release. For example, U.S. Pat. No. 6,387,986 describes a composition for the delayed release of cross-linking agents by encapsulating the cross-linking agents in a primary emulsion, and then emulsifying the primary emulsion into a second liquid. Despite such advances, there remains a need to develop improved compositions and techniques for the controlled and/or delayed release of oil and gas field chemicals.

In the present invention, a different approach is used for the controlled or delayed release of the oil and gas field chemicals. In the present invention, the oil and gas field chemicals are associated with polyelectrolyte complexes in order to control the release of such chemicals. The resulting nanoparticles also protect the oil and gas field chemicals from hostile down-hole and underground environments so that they can be successfully transported to the target locations underground. To date, polyelectrolytes have largely been used in the pharmaceutical industry to improve drug delivery. See, e.g., Prokop et al., U.S. Pat. No. 6,726,934 entitled Micro-particulate and nano-particulate polymeric delivery system; Tiyaboonchai et al., Formulation and Characterization of Amphotericin B-polyethylenimine-dextran sulfate nanoparticles, Int'l Journal of Pharmaceutics, 90, 902-914 (2001); Tiyaboonchai et al., *Insulin containing polyethylenimine-dextran sulfate nanoparticles, Int'l Journal of Pharmaceutics*, 225, 139-151 (2003). The present invention is the directed to the use of such polyelectrolyte complexes for applications involving oil and gas field chemicals.

BRIEF SUMMARY OF THE INVENTION

The present invention is directed to novel compositions for delivering, controlling, and delaying the release of an oil and gas field chemical to a target area. The composition comprises a polyanion and a polycation forming a polyelectrolyte complex, and an oil and gas field chemical associated with the polyelectrolyte complex. The oil and gas field chemical is preferably selected from the group consisting of (a) a gel-forming or cross-linking agent, (b) a scale inhibitor, (c) a corrosion inhibitor, (d) an inhibitor of asphaltene or wax deposition, (e) a hydrogen sulfide scavenger, (f) a hydrate inhibitor, (g) a breaking agent, and (h) a surfactant. The polyelectrolyte complex forms a particle having dimensions in the nanoparticle range.

Methods for forming the polyelectrolyte complex compositions of the present invention are also provided. In general, the polyanion, polycation, and oil and gas field chemical are mixed together in solution. In one aspect, the polyanion and polycation may first be mixed together separately prior to addition of the oil and gas field chemical. In another aspect, the polycation and oil and gas field chemical may be first mixed together separately prior to addition of the polyanion. In still another aspect, the polyanion and oil and gas field chemical may be first mixed together separately prior to addition of the polycation. The nanoparticles may be isolated using dialysis or other techniques known to those skilled in the art.

The compositions of the present invention are useful for controlling or delaying the release of the oil and gas field chemical when injected into a target area, i.e. well. Various techniques for injecting liquids and slurries into such wells are known in the art and can be utilized for injection of the compositions of the present invention.

Additional aspects of the invention, together with the advantages and novel features appurtenant thereto, will be set forth in part in the description that follows, and in part will become apparent to those skilled in the art upon examination of the following, or may be learned from the practice of the invention. The objects and advantages of the invention may be realized and attained by means of the instrumentalities and combinations particularly pointed out in the appended claims.

So that the matter in which the above-recited features, advantages and objects of the invention, as well as others which will become clear, are attained and can be understood in detail, more particular descriptions of the invention briefly summarized above may be had by reference to certain embodiments thereof which are illustrated in the appended drawings. These drawings form a part of the specification. It is to be noted, however, that the appended drawings illustrate preferred embodiments of the invention and therefore are not to be considered limiting in their scope.

DETAILED DESCRIPTION OF PREFERRED EMBODIMENT

Terms, when used in this application, have their common meaning unless otherwise specified. It should be noted that the alphabetical letters used in the formulas of the present invention should be interpreted as the functional groups, moieties, or substituents as defined herein. Unless otherwise defined, the symbols will have their ordinary and customary meaning to those skilled in the art.

The term "nanoparticle" shall refer to particle, preferably less than about 5000 nanometers in size, even more preferably less than 2000 nanometers in size, and still more preferably less than 100 nanometers in size. In one aspect, the size of the nanoparticle ranges from about 50 to 500 nm, and is preferably between about 100 to 300 nm.

The term "polyelectrolyte" refers to a macromolecule, usually a polymer, possessing more than one charge. The term "polyelectrolyte" includes polycations and polyanions.

The term "polymer" refers to a molecule built up by repetitive bonding together of smaller units called monomers. In this application, the term polymer includes both oligomers that have two to about 80 monomers and polymers having more than 80 monomers. The polymer can be linear, branched network, star, comb, or ladder types of polymer. The polymer can be a homopolymer in which a single monomer is used or can be copolymer in which two or more monomers are used. Types of copolymers include alternating, random, block, and graft. In general, a "random copolymer" contains a random arrangement of the multiple monomers, a "block copolymer" contains blocks of monomers of the same type, and a "graft copolymer" contains a main chain polymer consisting of one type of monomer with branches made up of other monomers.

One type of block copolymer comprises hydrophilic (water-loving) and hydrophobic (water-hating) blocks. Such a combination of hydrophilic and hydrophobic blocks is termed "amphiphilic." Common examples of amphiphilic small molecules are the "soaps,"—surface active agents such as stearic acid which comprise a water-soluble head group and a water-insoluble tail. Amphiphilic molecules, both large and small, tend to form aggregates, or micelles, in water where the hydrophobic regions associate and the hydrophilic groups present themselves, on the outside of the aggregate, to the water. Often, these aggregates are very small (less than 1 micron) and because of the electrostatic repulsions between them, they form stable colloidal dispersions in water. Charges on the amphiphilic diblock copolymers associate with polyelectrolytes of opposite charge to form polyelectrolyte complexes. Examples of amphiphilic diblock copolymers and their stable dispersions in water are polystyrene-block-poly (acrylic acid) (e.g. see Zhang and Eisenberg, J. Am. Chem. Soc. 1996, 118, 3168), polystyrene-block-polyalkylpyridinium (e.g. see Gao et al. Macromolecules 1994, 27, 7923), poly(dimethylaminoethylmethacrylate-block-poly(methyl methacrylate) (e.g. see Webber et al. Langmuir 2001, 17, 5551), and sulfonated styrene-block-ethylene/butylene (e.g. see Balas et al. U.S. Pat. No. 5,239,010, Aug. 24, 1993). See Zhang and Eisenberg, J. Am. Chem. Soc. 1996, 118, 3168; Gao et al. Macromolecules 1994, 27, 7923, Webber et al. Langmuir 2001, 17, 5551; Balas et al. U.S. Pat. No. 5,239,010, Aug. 24, 1993. Such block copolymers have been prepared with the A-B diblock, or the A-B-A triblock architectures.

The term "polycation" refers to a polyelectrolyte possessing net positive charge. While the polycation can contain monomer units that are charge positive, charge neutral, or charge negative, the net charge of the polymer is positive.

The term "polyanion" refers to a polyelectrolyte containing a net negative charge. While the polyanion can contain monomer units that are charge negative, charge neutral, or charge positive, the net charge on the polymer is negative.

The term "polymeric core" shall refer to the inner part of the polyelectrolyte complex.

The term "polymeric shell" or "corona" refers to the outer layer of polyelectrolyte complex.

The term "associated with" means that the oil and gas field chemical is complexed with or partially or completely encapsulated by the polyelectrolyte complex. Thus, the oil and gas field chemical may interact with the exterior or interior surface of the polyelectrolyte complex (e.g. the corona or core).

The term "complex" means the interaction between two molecules or portions of the same molecule through noncovalent interactions such as coordination bonds, electrostatic interactions, hydrogen bonding interactions, and hydrophobic interactions.

The term "partially or completely encapsulate" means that the oil and gas field chemical is partially or completely localized in the interior or center of the polyelectrolyte complex.

The present invention is directed to a composition useful for oil and gas field applications. The composition comprises a polyelectrolyte complex associated with an oil and gas field chemical, wherein the complex controls the placement and/or release of oil and gas field chemical. It is contemplated that mixtures of various oil and gas filed chemicals may also be associated with the polyelectrolyte complex.

In one aspect, the polyelectrolytes of the present invention form a complex that is characterized as a nanoparticle. In some instances, it is theorized that the nanoparticles comprise a polymeric core and a polymeric shell that are opposite in charge. For example, a polyanionic core may be covered by a polycationic shell or corona. It will be appreciated that the nanoparticle may alternatively comprise a polycationic core and a polyanionic shell or corona.

In one non-limiting aspect, the oil and gas field chemical is associated with the nanoparticle corona. In another non-limiting aspect, the oil and gas field chemical is associated with the nanoparticle core.

In an additional aspect, the present invention includes a composition comprising one or more polyelectrolytes and one or more charged polymeric surface modifiers (electrostatic stabilizers), the latter being incorporated in one step together with other polymeric components as an integral part of the complex. Similarly, a nonionic polymeric surface modifier (steric stabilizer) is integrated into the polymer structure via an entrapment. Both classes of surface modifiers may be included to prevent particle aggregation.

The nanoparticles may include various low molecular weight ions, e.g. cations or anions. For example, calcium ions can be complexed with the polyanions. As another example, triphosphate ions can be complexed with the polycations. Typically, the ions are present in an amount up to about 5.0 wt-%. Furthermore, such nanoparticles may comprise a monovalent or bivalent inorganic salt, such as sodium chloride, calcium chloride, or sodium sulfate. The addition of such ions may increase the stability of the nanoparticles and results in, inter alia, increased entrapment efficiency for a more efficacious delivery of a oil and gas field chemical.

As alluded to above, it will be appreciated to those skilled in the art that the charges on the polyelectrolytes may be arranged in a spatially regular or irregular manner. Further, the polyelectrolytes may be synthetic (synthetic polyelectrolytes), naturally occurring (such as proteins, enzymes, polynucleic acids), or synthetically modified naturally occurring macromolecules (such as modified celluloses and lignins).

The charges on a polyelectrolyte may be derived directly from the monomer units or they may be introduced by chemical reactions on a precursor polymer. For example, poly(diallyidimethylammonium chloride) ("PDAD") is made by polymerizing diallyidimethylammonium chloride, a positively charged water soluble vinyl monomer. The positively-charged copolymer PDAD-co-PAC (i.e., poly(diallyidimethylammonium chloride) and polyacrylamide copolymer) is made by the polymerization of diallyidimethylammonium chloride and acrylamide (a neutral monomer that remains neutral in the polymer). Poly(styrenesulfonic acid) is often made by the sulfonation of neutral polystyrene. Poly(styrenesulfonic acid) can also be made by polymerizing the negatively charged styrene sulfonate monomer.

Various polyelectrolytes comprising polyanions are well known to those skilled in the art. Weak polyanions typically include carboxylic acid groups while strong polyanions typically include sulfonic acid groups, phosphonic acid groups, or sulfate groups. Examples of a negatively-charged polyelectrolyte include polyelectrolytes comprising a sulfonate group ($—SO_3$), such as poly(styrenesulfonic acid) ("PSS"), poly(2-acrylamido-2-methyl-1-propane sulfonic acid) ("PAMPS"), sulfonated poly(ether ether ketone) ("SPEEK"), sulfonated lignin, poly(ethylenesulfonic acid), poly(methacryloxyethylsulfonic acid), their salts, and copolymers thereof; polycarboxylates such as poly(acrylic acid) ("PAA") and poly(methacrylic acid); and sulfates such as carragenin. Other polyanions include HV-sodium alginate, sodium alginate, sodium hyaluronate, heparin sulfate, cellulose sulfate, kappa carrageenan, pentasodium tripolyphosphate, low-esterified pectin (polygalacturonic acid), polyglutamic acid, carboxymethylcellulose, chondroitin sulfate-6, chondroitin sulfate-4, and collagen.

Various polyelectrolytes, which are polycations, are also well known to those skilled in the art. Exemplary polycationic polymer components include polyvinylamine, spermine hydrochloride, protamine sulfate, poly(methylene-co-guianidine) hydrochloride, polyethylenimine, polyethylenimine-ethoxylated, polyethylenimine-epichlorhydrin modified, quartenized polyamide, polydiallyidimethyl ammonium chloride-co-acrylamide, and chitosan. Other examples of a positively-charged polyelectrolytes include quaternary ammonium group, such as poly(diallyidimethylammonium chloride) ("PDAD"), poly(vinylbenzyltrimethyl-ammonium) ("PVBTA"), ionenes, poly(acryloxyethyltrimethyl ammonium chloride), poly(methacryloxy(2-hydroxy)propyltrimethyl ammonium chloride), and copolymers thereof; polyelectrolytes comprising a pyridinium group, such as, poly(N-methylvinylpyridine) ("PMVP"), other poly(N-alkylvinylpyridines), and copolymers thereof; and protonated polyamines such as poly(allylaminehydrochloride) ("PAH") and polyethyleneimmine ("PEI").

Typically, the polyelectrolyte complexes are formed in solution. Thus, in one aspect of the present invention, the polyelectrolytes used to deliver the oil and gas chemicals of the present invention are water and/or organic soluble, or dispersed in water and/or organic solvent.

An appropriate solvent is one in which the selected polyelectrolyte is soluble. Thus, the appropriate solvent is dependent upon whether the polyelectrolyte is considered to be hydrophobic or hydrophilic. A hydrophobic polymer displays a less favorable interaction energy with water than a hydrophilic polymer. While a hydrophilic polymer is water soluble, a hydrophobic polymer may only be sparingly soluble in water, or, more likely insoluble in water. Likewise, a hydrophobic polymer is more likely to be soluble in organic solvents than a hydrophilic polymer. In general, the higher the carbon to charge ratio of the polymer, the more hydrophobic it tends to be. For example, poly(vinyl pyridine) alkylated with a methyl group ("PNM4VP") is considered to be hydrophilic, whereas poly(vinyl pyridine) alkylated with an octyl group ("PNO4VP") is considered to be hydrophobic. Thus, water is preferably used as the solvent for hydrophilic polyelectrolytes and organic solvents such as alcohols (e.g., ethanol) are preferably used for hydrophobic polyelectrolytes. Examples of polyelectrolytes used in accordance with this invention that are soluble in water, include poly(styrenesulfonic acid), poly(2-acrylamido-2-methyl-1-propane sulfonic acid), sulfonated lignin, poly(ethylenesulfonic acid), poly(methacryloxyethylsulfonic acid), poly(acrylic acids), poly(methacrylic acids) their salts, and copolymers thereof; as well as poly(diallyidimethylammonium chloride), poly (vinylbenzyltrimethylammonium), ionenes, poly(acryloxyethyltrimethyl ammonium chloride), poly(methacryloxy(2-hydroxy)propyltrimethyl ammonium chloride), and copolymers thereof; and polyelectrolytes comprising a pyridinium group, such as, poly(N-methylvinylpyridine), and protonated polyamines, such as poly(allylamine hydrochloride) and poly(ethyleneimine). Examples of polyelectrolytes that are soluble in non-aqueous solvents, such as ethanol, methanol, dimethylformamide, acetonitrile, carbon tetrachloride, and methylene chloride include poly(N-alkylvinylpyridines), and copolymers thereof, where the alkyl group is longer than about 4 carbons. Other examples of polyelectrolytes soluble in organic solvents include poly(styrenesulfonic acid), poly(2-acrylamido-2-methyl-1-propane sulfonic acid), poly(diallyldimethylammonium chloride), poly (N-methylvinylpyridine) and poly(ethyleneimmine) where the small polymer counterion, for example, $Na^+$, $Cl^-$, $H^+$, has been replaced by a large hydrophobic counterion, such as tetrabutyl ammonium or tetrathethyl ammonium or iodine or hexafluorophosphate or tetrafluoroborate or trifluoromethane sulfonate.

The polyelectrolyte complexes of the present invention may be prepared by providing a stream of uniformly-sized drops of a charged polymer solution in which the particle size of the drops is submicron or at most only a few microns, collecting these droplets in a stirred reactor provided with a polymeric solution of opposite charge, and reacting the droplets and the solution to form the particles. When the drops of polymer are polyanionic and the receiving polymer solution is cationic, the particles have a polyanionic core and a shell or corona of a polyanionic/polycationic complex. The periphery of the particle has an excess positive charge. Conversely, drops of a stream of cationic solution can be collected in a polyanionic solution. These particles have polycationic core and shell of a polycationic/polyanionic complex with an excess of negative charge on the particle periphery.

Alternatively, the polyelectrolyte complexes may be prepared utilizing a mixing device, e.g., microfabricated mixing device, of complex geometry, suitable for laminar flowing. Flow rates may be continuous or may be pulsed. The oscillatory flow of at least one fluid provides increased fluid flow for mixing and improved processing. Thus, the process is scaled-up.

Mixing devices that use multiple, reactant fluid streams with very high mixing energy density and enhanced mixing intimacy of reactants provide fast and controlled reaction chemistry not available from conventional batch reaction technology. U.S. Pat. No. 6,221,332 provides a means to develop and manufacture nanomaterials in a process controllable to the molecular level of mixing. Generally, the microfabricated design, in that the system may be scaled-up, provides a much higher throughput, and unlike batch processes, can be operated continuously.

The mixing device may be coupled to a device, such as an autotitrator, which can measure the size or charge density of polyelectrolyte complexes, in real time, within the output of the mixing device, providing for feedback and correction of the chemistry of the reacting streams, in terms of ratio of flow of individual streams, pH of the streams, salt content of the streams and, alternatively, ethanol content, as a de-solvating agent, within one of the streams, in order to control the final output of the process It will be appreciated that some of the polyelectrolytes used in accordance with this invention only become charged at certain pH values. For example, poly(acrylic acids) and derivatives thereof are protonated (uncharged) at pH levels below about 4-6, however, at pH levels of at least about 4-6 the poly(acrylic acid) units ionize and take on a negative charge. Similarly, polyamines and derivatives thereof become charged if the pH of the solution is below about 4. Thus, the pH of the solution may be adjusted in order to optimize the polyelectrolyte complex formation.

The polyelectrolytes typically comprise about 0.01% to 1% by weight of a polyelectrolyte solution, and most preferably about 0.1 to 0.5% by weight. When lower molecular weight compounds are used (e.g. calcium ions), the weight percentage may be higher, for example 5% by weight.

Exemplary polyelectrolyte complexes used for drug delivery are disclosed in Prokop, U.S. Pat. No. 6,726,934 entitled "Micro-Particulate and Nano-Particulate Polymeric Delivery System," which is incorporated by reference.

The polyelectrolyte complexes are used to control the release of various oil and gas field chemicals. Suitable oil or gas field chemicals include (a) gel-forming or cross-linking agents, (b) scale inhibitors, (c) corrosion inhibitors, (d) inhibitors of asphaltene or wax deposition, (e) hydrogen sulfide scavengers, (f) hydrate inhibitors, (g) breaking agents, and (h) surfactants.

A. Gel-Forming or Cross-Linking Agents

For oil and gas recovery operations, it is often desirable to reduce water production. To reduce the water production, a common technique used is to inject a polymer solution together with a crosslinker agent in order to form gels capable of reducing water permeability without affecting oil productivity. The well treatment success depends on the in situ formation of the gel after that the effective placement of the solution polymer in the porous media.

In many instances, it is desirable to delay the gel formation with the controlled release of crosslinker agents. The polyelectrolyte complexes of the present invention are useful for delivering gel-forming or cross-linking agents over a period of time. Any conventional cross-linking agent can be used in accordance with the present invention. Exemplary agents are generally described in Moradi-Arghai, et al., U.S. Pat. No. 6,387,986, which is incorporated by reference.

The crosslinker agents can be ionic (like Cr(III) in $CrCl_3$, etc.), organo-metallic (e.g., Cr (III) acetate, see Sydansk., SPE 17329. A new conformance-improvement-treatment Chromium (III) gel technology (1988)), Al(IV) citrate or Zr(IV) lactate or citrate (see Cui et al., *Preparation of a retarded crosslinking system with HPAM and Zirconium citrate*, J. Petro. Univ China, 1992, 16(3):40-55) or organic (polyethylenimine or phenol-formaldehyde). See also Sydansk, U.S. Pat. No. 6,103,772 entitled "Foamed gel for permeability reduction or mobility control in a subterranean hydrocarbon-bearing formation," which is incorporated by reference. Hydrolyzed polyacrylamides have been cross-linked with the mentioned polyvalent cations. Acrylamide copolymers have been organically cross-linked with cations or polyethylenimine (Hardy et al., SPE 50738, *The first carbonate field-application of a new organically crosslinked water shutoff polymer system*, (1999)).

Generally, the cross-linking agent is selected from the group consisting of multivalent metallic compounds and organic cross-linking agents. Exemplary multivalent metal compounds include complexed zirconium compound, a complexed titanium compound, a complexed chromium compound, a complexed aluminum compound, a complexed tin compound, a complexed iron compound, and mixtures thereof. The term "complexed" as used in reference to a gel-forming or cross-linking agent means a compound formed by the union of a metal ion with a nonmetallic ion or molecule called a ligand. Suitable multivalent metallic compounds are selected from the group consisting of zirconium citrate, zirconium tetrachloride, zirconium oxychloride, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis(triethanolamine)zirconate, zirconium carbonate, ammonium zirconium carbonate, zirconyl ammonium carbonate, zirconium lactate, titanium acetylacetonate, titanium ethylacetoacetate, titanium citrate, titanium triethanolamine, ammonium titanium lactate, aluminum citrate, chromium nitrate, chromium chloride, chromium citrate, chromium acetate, chromium propionate, and combinations of any two or more thereof. Most preferred cross-linking agents include chromium chloride, chromium propionate, chromium acetate, zirconium acetylacetonate, zirconium tetrachloride, zirconium oxychloride, zirconium lactate, zirconium citrate, zirconium malonate, tetrakis(triethanolamine) zirconate, zirconium complex of hydroxyethyl glycine, zirconium tartarate, zirconium propionate, titanium acetylacetonate, titanium ethylacetoacetate, titanium citrate, titanium triethanolamine, and combinations of any two or more thereof.

An organic cross-linking agent can also be utilized in said gel-forming composition. For example, said organic cross-linking agent can be selected from the group consisting of formaldehyde; precursors of formaldehyde, such as, hexamethylenetetramine; furfuryl alcohol; aminobenzoic acid; phenol and phenolic derivatives, such as, hydroquinone, phloroglucinol, catechol, resorcinol, salicylic acid, salicylamide, and vanillin. A more detailed description of organic cross-linking agents can be found in U.S. Pat. Nos. 5,399,269 and 5,480,933, herein incorporated by reference B. Scale Inhibitors When a well bore is initially drilled in an oil field, the oil extracted is usually "dry," being substantially free of aqueous impurities. However, as the oil reserves dwindle, a progressively greater quantity of aqueous impurities becomes mixed with the oil. Changes in formation physical conditions during the production cycle as well as mixing of incompatible waters (i.e. sea water and barium or strontium containing formation waters) can cause scaling in any part of the production system. Scale that occurs in the production system can result in a significant loss in production and associated revenue.

As used herein, the term "scale" refers to a deposit or coating formed on the surface of metal, rock or other material, such as a conduit. Scale is caused by a precipitation due to a chemical reaction with the surface, precipitation caused by chemical reactions, a change in pressure or temperature, or a change in the composition of a solution. Typical scales are calcium cabonate, calcium sulfate, barium sulfate, strontium sulfate, iron sulfide, iron oxides, iron carbonate, the various silicates and phosphates and oxides, or any of a number of compounds insoluble or slightly soluble in water.

In the present invention, polyelectrolyte complexes are used to deliver scale inhibitors to the oil or gas well. Various scale inhibitors are known to those of skill in the art. The dissolution of sulfates scales can be readily dissolved using strong chelating agents like ethylenediamine tetra acetic acid ("EDTA") and diethylenetriamino-pentaacetic acid ("DTPA"), which form a surface complex when in contact with scale. The dissolution rate is controlled by desorption and diffusion of complexes (Ba-EDTA/DTPA) (Heriot-Watt University, FAST Team, 2005, Scale Dissolvers. http://pet.hw.ac.uk/research/fast1/research/scla_diss.htm).

A common scale control technique consists in squeezing a scale inhibitor into the formation rock where it is adsorbed or precipitates as a complex on the surface. When production is restored, the scale inhibitor dissolves or desorbs into the brine, preventing scale formation. See Andrei and Gagliardi, *Redissolution studies in bulk and coreflood for PPCA scales inhibitor*, Journal of Petroleum Science and Engineering, 43, 35-55 (2004). The development of biodegradable polymers, especially phosphorus containing polymers as scale inhibitors, has also been stimulated for new environmental regulations, such as those described in Woodward, WO 2004/056886 entitled "Biodegradable Polymers."

Common chemistries for scale inhibitors include phosphonates, polymers like the polyacrylic acid, and phosphate esters. In general, scale inhibitors include water-soluble organic molecules having at least 2 carboxylic and/or phosphonic acid and/or sulphonic acid groups e.g. 2-30 such groups. Preferred scale inhibitors are oligomers or polymers, or may be monomers with at least one hydroxyl group and/or amino nitrogen atom, especially in hydroxycarboxylic acids or hydroxy or aminophosphonic, or, sulphonic acids. Scale inhibitors are used primarily for inhibiting calcium and/or barium scale. Examples of such compounds used as scale inhibitors are aliphatic phosphonic acids having 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different (e.g. as described further in published EP-A-479462, the disclosure of which is herein incorporated by reference). Other scale inhibitors are polycarboxylic acids such as acrylic, maleic, lactic or tartaric acids, and polymeric anionic compounds such as polyvinyl sulphonic acid and poly(meth)acrylic acids, optionally with at least some phosphonyl or phosphinyl groups as in phosphinyl polyacrylates. The scale inhibitors are suitably at least partly in the form of their alkali metal salts e.g. sodium salts.

In one aspect, examples of scale inhibitors that are suitable for use in the compositions of the present invention include, hexamethylene diamine tetrakis (methylene phosphonic acid), diethylene triamine tetra (methylene phosphonic acid), diethylene triamine penta (methylene phosphonic acid), bis-hexamethylene triamine pentakis (methylene phosphonic acid), polyacrylic acid (PAA), phosphino carboxylic acid (PPCA) iglycol amine phosphonate (DGA phosphonate); 1-hydroxyethylidene 1,1-diphosphonate (HEDP phosphonate); bisaminoethylether phosphonate (BAEE phosphonate) and polymers of sulphonic acid on a polycarboxylic acid backbone. Other suitable scale inhibitors include for example polyphosphates and polycarboxylic acids and copolymers such as described in U.S. Pat. No. 4,936,987.

The success of a scale inhibitor treatment depends on the length of time (squeeze lifetime) that the inhibitor is released to prevent scale formation. The squeeze lifetime can be increased by using polyelectrolyte complexes with a surface charge that is opposite to that of the formation rock. The release time could be adjusted entrapping the scale inhibitor in a polyelectrolyte complex.

C. Corrosion Inhibitors.

The polyelectrolyte complexes of the present invention are also useful for controlling the release of corrosion inhibitors in oil and gas wells. An example of a cathodic inhibitor is zinc oxide that retards the corrosion by inhibiting the reduction of water to hydrogen gas. Corrosion inhibitors, which are typically organic-amine based compounds like hexamine, phenylenediamine, dimethylethanoamine, sodium nitrite, imidazoline derivatives, etc. Most inhibitors are organic, cationic, nitrogen-based chemistries. Linear or cyclic amines, fatty acids, or quaternary amines chemistries are common. A preferred corrosion inhibitor is benzyldimethyltetradecylammonium chloride. Carrier fluids can be water, alcohol or hydrocarbons (PTTC Corrosion Management Workshop, Farmington, N. Mex. (2002)).

Examples of corrosion inhibitors are compounds for inhibiting corrosion on steel, especially under anaerobic conditions, and may especially be film formers capable of being deposited as a film on a metal surface e.g. a steel surface such as a pipeline wall. Such compounds may be non-quaternised long aliphatic chain hydrocarbyl N-heterocyclic compounds, where the aliphatic hydrocarbyl group may be as defined for the hydrophobic group above; mono- or di-ethylenically unsaturated aliphatic groups e.g. of 8-24 carbons such as oleyl are preferred. The N-heterocyclic group can have 1-3 ring nitrogen atoms with 5-7 ring atoms in each ring; imidazole and imidazoline rings are preferred. The ring may also have an aminoalkyl e.g. 2-aminoethyl or hydroxyalkyl e.g. 2-hydroxyethyl substituent. Oleyl imidazoline may be used. Where corrosion inhibitors are released using the polyelectrolyte complexes of the present invention, these inhibitors are effective in reducing corrosion of metal surfaces as they are produced out of the well.

D. Asphaltene, Paraffin, or Wax Inhibitors

Arterial blockage in the petroleum industry is mostly due to the deposition of heavy organics from petroleum fluids. Heavy organics such as paraffin/wax, resin, asphaltene, diamondoid, mercaptans, and organometallic compounds may exist in crude oil in various quantities and forms. Such compounds could precipitate out of the crude oil solution due to various forces causing blockage in the oil reservoir, in the well, in the pipelines and in the oil production and processing facilities. The polyelectrolyte complexes of the present invention are useful for controlling the release of inhibitors of such compounds to the oil and gas well.

Aphaltene inhibitors include amphoteric fatty acid or a salt of an alkyl succinate while the wax inhibitor may be a polymer such as an olefin polymer e.g. polyethylene or a copolymeric ester, e.g. ethylene-vinyl acetate copolymer, and the wax dispersant may be a polyamide.

E. Hydrogen Sulfide Scavengers

The polyelectrolyte complexes of the present invention are also useful for controlling the release of hydrogen sulfide scavengers in oil and gas wells. The hydrogen sulfide scavengers of the present invention preferably remove all soluble sulfide species, $H_2S$, $S^{-2}$ and $HS^-$, and forms a product that is nonhazardous and noncorrosive. Zinc compounds are commonly used to precipitate ZnS and decrease the concentration of all three sulfides that are in equilibrium in a solution to a very low concentration. For water mud, zinc basic carbonate, and, for oil mud, zinc oxide, are recognized to be effective sulfide scavengers.

F. Hydrate Inhibitors

The polyelectrolyte complexes of the present invention are also useful for controlling the release of hydrate inhibitors in oil and gas wells. Hydrates are formed of two components, water and certain gas molecules, e.g. alkanes of 1-4 carbons, especially methane and ethane, such as those found in natural gas. These "gas" hydrates will form under certain conditions, i.e. when the water is in the presence of the gas and when the conditions of high pressure and low temperature reach respective threshold values. The gas may be in the free state or dissolved in a liquid state, for example, as a liquid hydrocarbon.

The hydrate inhibitors are often use in combination with a corrosion inhibitor and optionally a water soluble polymer of a polar ethylenically unsaturated compound. Preferably, the polymer is a homopolymer or a copolymer of an ethylenically unsaturated N-heterocyclic carbonyl compound, for example, a homopolymer or copolymer of N-vinyl-omega caprolactam. Such hydrate inhibitors are disclosed in U.S. Pat. Nos. 6,436,877, 6,369,004, EP 0770169 and WO 96/29501 which are herein incorporated by reference.

G. Breakers

Oil well stimulation typically involves injecting a fracturing fluid into the well bore to create fractures in the rock formation surrounding the bore. The fracturing fluid typically contains a water soluble polymer, such a guar gum or a derivative thereof, which provides appropriate flow characteristics to the fluid and suspends the proppant particles therein. When pressure on the fracturing fluid is released and the fracture closes around the propping agent, water is forced therefrom and the water-soluble polymer forms a compacted cake. This compacted cake can prevent oil or gas flow if not removed. To solve this problem, "breakers" are included in the fracturing fluid.

In the present invention, the breakers are associated with the polyelectrolyte complexes of the present invention for controlled or delayed release. The breakers may be either enzymatic breakers or oxidative breakers. Examples of such breakers include oxidizers such as sodium persulfate, potassium persulfate, magnesium peroxide, ammonium persulfate, and the like. Enzyme breakers that may be employed include alpha and beta amylases, amyloglucosidase, invertase, maltase, cellulose, pectinase, and hemicellulase. See generally J. Gulbis, Fracturing Fluid Chemistry, in RESERVOIR STIMULATION, Chapter 4 (J. J. Economides and K. G. Nolte, Eds., 2d Ed. 1989); U.S. Pat. No. 4,996,153 (heat-stable enzyme breaker which may be used as a viscosity breaker in oil recovery, breaker is a xanthanase for degrading xanthan-based rather than guar-based fracturing fluids); U.S. Pat. No. 5,201,370 (enzyme breakers for galactomannan-based fracturing fluids); U.S. Pat. No. 4,250,044 (tertiary amine/persulfate breaker system); WO 91/18974 (hemicellulase enzyme), all of which are incorporated by reference.

H. Surfactants

The basic physics behind the surfactant flooding enhanced oil recovery ("EOR") process is that the residual oil dispersed as micron-size ganglia is trapped by high capillary forces within the porous media. Increasing the fluid flow viscous forces or decreasing the capillary forces holding the oil in place are required before the oil can be pushed through the pore throats and sent on to a production well. The interfacial tension between the crude oil and the aqueous phase needs to be reduced to ultra-low values, (target 0.001 mN/m), several orders of magnitude below that of a typical reservoir brine-oil system, if the residual oil is to be mobilized through the injection of surfactant solutions. The main challenge with surfactant flooding is the tendency of the surfactant molecules to precipitate when coming into contact with the formation brine. The polyelectrolyte complexes can entrap or encapsulate and therefore protect the surfactant molecules from the formation brine.

Surfactants associated with the polyelectrolyte complexes may be anionic, cationic, amphoteric, or nonionic surface active agents. Suitable anionic surfactants include, but not limited to those containing carboxylate, sulfonate, and sulfate ions. Examples for anionic surfactants are sodium, potassium, ammonium of long chain alkyl sulfonates and alkyl aryl sulfonates such as sodium dodecylbenzene sulfonate; dialkyl sodium sulfosuccinates, such as sodium dodecylbenzene sulfonate; dialkyl sodium sulfosuccinates, such as sodium bis-(2-ethylthioxyl)-sulfosuccinate; and alkyl sulfates such as sodium lauryl sulfate. Cationic surfactants include, but not limited quaternary ammonium compounds such as benzalkonium chloride, benzethonium chloride, cetrimonium bromide, stearyl dimethylbenzyl ammonium chloride, polyoxyethylene (15), and coconut amine. Examples for nonionic surfactants are, but not limited to, ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolauwdrate, polyoxyethylene (8) monolaurate, polysorbates, ii polyoxyethylene (9) octylphenylether, PEG-1000 cetyl ether, polyoxyethylene (3) tridecyl ether, polypropylene glycol (18) butyl ether, Poloxamer 401, stearoyl monoisopropanolamide, and polyoxyethylene (5) hydrogenated tallow amide. Examples for amphoteric surfactants are, but not limited to, sodium N-dodecyl-beta-alanine, sodium N-lauryl-beta-iminodipropionate, myristoamphoacetate, lauryl betaine, and lauryl sulfobetaine.

Most preferred surfactants used in EOR include alkyl aryl sulfonates, alkyl sulfates as sodium dodecyl sulfate ("SDS"), alcohol propoxylate sulfate. See generally Wu et al., SPE 95404: *A Study of Branched Alcohol Propoxylate Sulfate Surfactants for Improved Oil Recovery* (2005).

The present invention is further illustrated by the following examples that are merely for the purpose of illustration and are not to be regarded as limiting the scope of the invention or manner in which it may be practiced.

Example 1

Formation of Nanoparticles Using Polyelectrolyte Complexes

In this example, various nanoparticles comprised of polyelectrolyte complexes were prepared. It will be appreciated that the materials used in this example are for illustrative purposes and are non-limiting.

In this example, chitosan (Mw=15 kDa, 84% deacetylated and Mw=about 100 kDa, 88-93% deacetylated Polysciences, Inc.), dextran sulfate (Mw=500 kDa and Mw=8 kDa, Fisher Scientific), polyethylenimine (Mw=10 kDa, Aldrich), and poly-L-lysine (Mw=10 kDa, Sigma) were used as obtained without further purification. Zinc sulfate heptahydrate (Sigma) was used as a nanoparticle crosslinker in some experiments. Microsep™ centrifugal devices (Pall Life Sciences), dialysis membranes (Spectrum), side-A-lyzer dialysis cassettes (Pierce), and mannitol (Sigma) were used during particle purification.

About 1.6 mL of the appropriate polycationic solution (0.1% w/v) was added dropwise to about 0.8 mL of 1% (w/v) dextran sulfate and stirred for five minutes. For chitosan, a solution pH of about 5.5 (hydrochloric acid) was required to dissolve this material. Finally, about 80 µL of zinc sulfate solution was added and stirred for 30 minutes. The prepared particles were dialyzed against 50 mM phosphate buffer with 5% mannitol for about 24 hours.

The mean particle size was determined by dynamic light scattering experiments (Brookhaven BI-9000AT with BI-200SM goniometer equipped with a helium-neon diode laser operating at 532 nm). An aliquot of lyophilized particles was dissolved in water and each measurement was performed at about 90° over a period of about three minutes. The effective diameter was determined by the method of cumulants. The surface charge of the particles was investigated by phase analysis light scattering using a ZetaPALS instrument (Brookhaven Instruments Corp.) equipped with a solid state laser operating at 676 nm. Samples were prepared by dispersing about 5 mg of the lyophilized nanoparticles in about 1 mL of nanopure water and three measurements were taken for each sample. The surface charge was calculated based on Smoluchowski approximation from the electrophoretic mobility of the sample in 50 µm KCl. The morphology of the particles was examined by transmission electron microscopy (JEM-1200EXII, JEOL,). The lyophilized particles were dialyzed against nanopure water for about 24 hours using dialysis tubing (MWCO 15,000) to remove mannitol from the sample. Seven microliters of the dialyzed sample along with three microliters of 2% (w/v) phosphotungstate solution was placed on a 300 mesh copper grid with a carbon-coated Formvar membrane. The sample was allowed to sit for about two minutes and then the excess water was removed with a No. 1 Whatman filter paper. The sample was kept in a desiccator overnight and examined by TEM.

Figure 1:
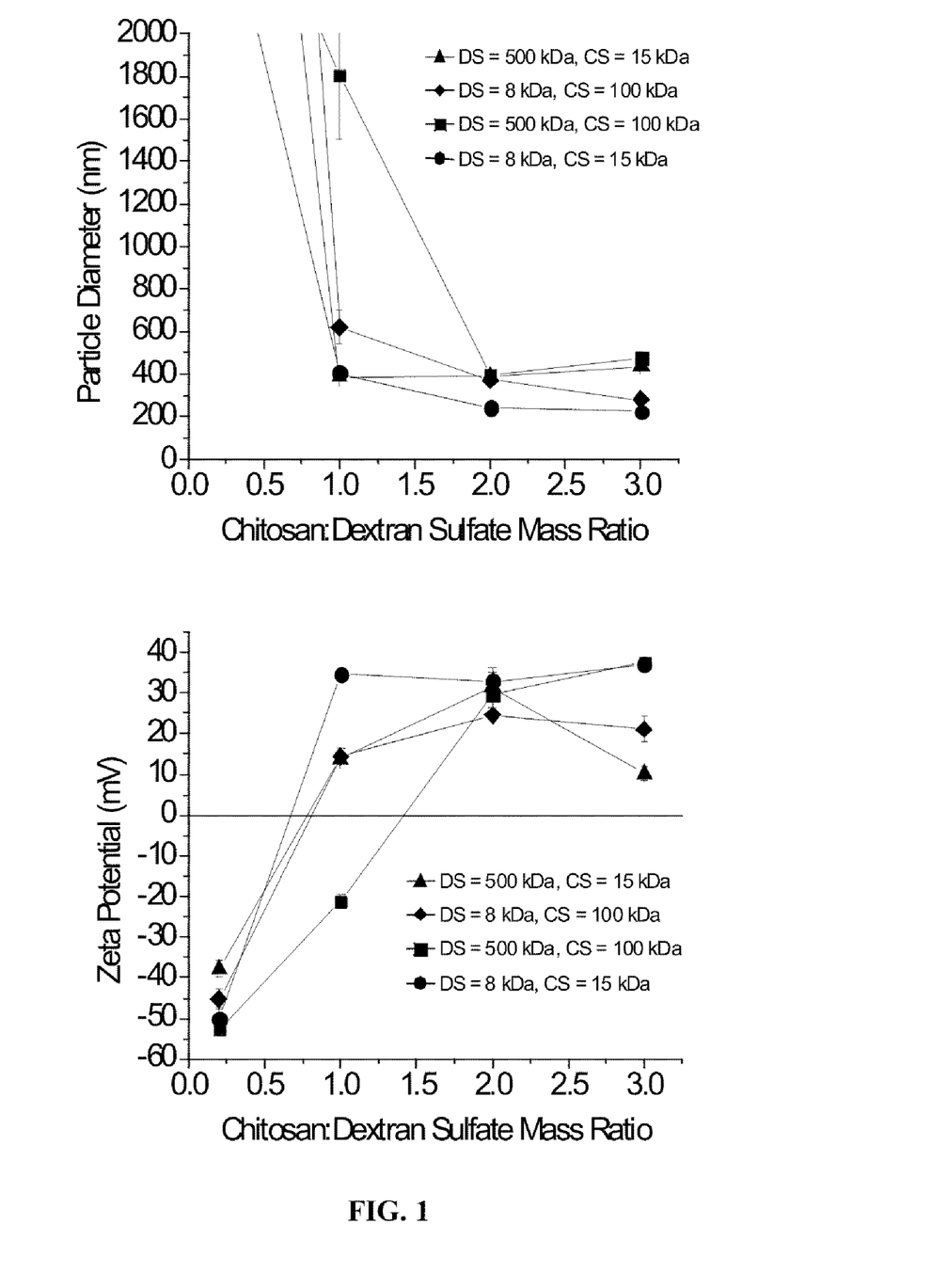
FIG. 1 shows that varying the mass ratio of dextran sulfate ("DS") to chitosan ("CS") allows control of (A) particle size and (B) zeta potential depending on the molecular mass of polyelectrolytes used (see legends). Large precipitates form as the charge ratio approaches zero (DS:CS=0.2). Nanometer size range is emphasized in (A).
Figure 2:
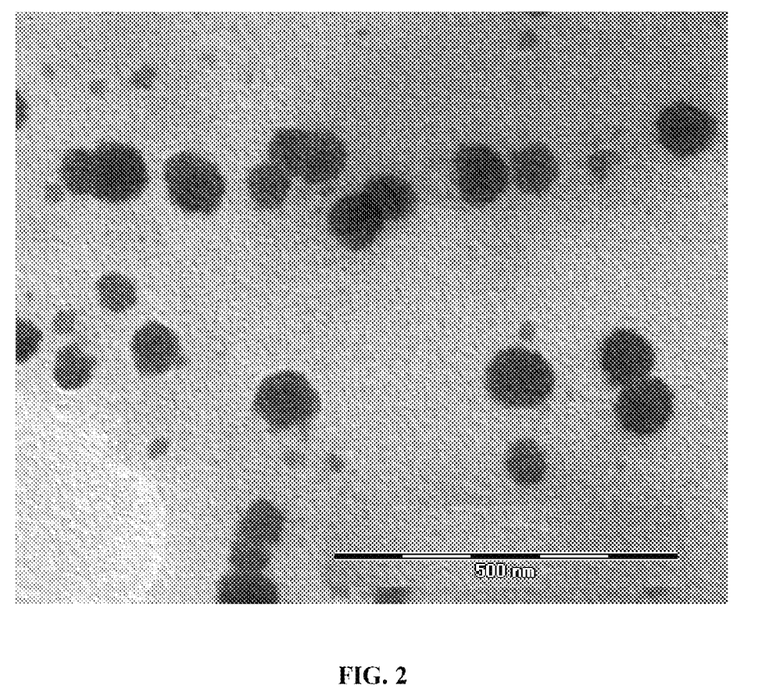
FIG. 2 is a transmission electron microscopy ("TEM") image of DS/CS nanoparticles prepared in accordance with procedures set forth in Example 1.

Dextran sulfate was paired with three polycations (chitosan, polyethylenimine, and poly-L-lysine) to determine the effect of these materials on particle size, polydispersity, and zeta potential. Prior to the work reported, various polyelectrolyte molecular weights and concentrations were screened to determine conditions for most effectively forming nanoparticles around 200 nm. Varying polyelectrolyte molar mass and the mass ratio of polycation to dextran sulfate resulted in direct control over polymer complex diameter and zeta potential including the production of small (about 100 to 300 nm, preferably about 200 nm) complexes. Exemplary data for chitosan paired with dextran sulfate are shown in FIG. 1, and exemplary DS/CS nanoparticles are shown in FIG. 2. The results for polyethylenimine or poly-L-lysine complexed with dextran sulfate were optimized for obtaining particles of about 200 nm in size as shown in the table below:

TABLE 1

| Nanoparticle formulation | Diameter (nm) | Polydispersity | Zeta potential (mV) |
|---|---|---|---|
| Chitosan/DS | 165 ± 17 | 0.26 ± 0.02 | 6.3 ± 6.0 |
| Polyethylenimine/DS | 205 ± 33 | 0.25 ± 0.05 | −6.3 ± 7.3 |
| Poly-L-lysine/DS | 182 ± 24 | 0.01 ± 0.00 | −16.7 ± 8.1 |

A Brookhaven ZetaPALS was used to analyze about 5 mg/mL solutions of the complexes in deionized (DI) water. Increasing polyelectrolyte concentration generally resulted in the formation of a precipitate. In general, the zeta potential of nanoparticle formulations was low and a fairly large standard deviation was noted between preparations.

Example 2

Polyelectrolyte Complex Associated with a Cross-Linking Agent (Chromium (III))

In this example, a composition comprising a cross-linking agent (chromium III) associated with a polyelectrolyte complex was prepared.

The nanoparticles with Cr (III) as the oil and gas field chemical were prepared at room temperature. About 59.0 g of a dextran sulfate (Mw=500 kDa, Fisher Scientific) aqueous solution (10,000 ppm) were added drop wise to about 133.0 g of a polyethylenimine (Mw=25 kDa, Aldrich) aqueous solution (10,000 ppm), which was continuously stirred. After stirring for about 15 minutes at 350 rpm 0.46 g of $CrCl_3.6H_2O$ (Mw=266.45, Fisher Scientific) was added and the resulting nanoparticles were stirred for about 30 minutes at about 350 rpm.

The nanoparticles were washed 24 hours in the dark by dialysis against a 5% w/v D-mannitol aqueous solution, and 24 hours more against a fresh 2.5% w/v D-mannitol solution using a Spectra/Por CE dialysis membrane with MWCO 10,000. The purified, Cr(III) loaded nanoparticles solution was frozen for about two hours at −70 F before being lyophilized at 0.024 Torr and −46° C. for 48 hours. The lyophilized nanoparticles were stored in a dessicator.

The zeta potential of the dialyzed nanoparticles was −22.4±1.9 mV determined by phase analysis light scattering employing a ZetaPALS instrument (Brookhaven Instrument Corp).

The particle size of the nanoparticles was determined by dynamic light scattering with a ZetaPALS instrument at a fixed angle of 90° and wavelength of 662 nm. The effective diameter after dialysis was 190±1 nm.

The loading efficiency of Cr (III) was 77.4% determined by subtracting the weight of Cr (III) in the freeze-dried nanoparticles from the initial weight of Cr(III) in the reaction media. The Cr (III) content was determined as chromate ion measuring the light absorption at 375 nm.

Example 3

Polyelectrolyte Complex Associated with a Scale Inhibitor (Polyacrylic Acid)

In this example, a composition comprising a scale inhibitor (polyacrylic acid) associated with a polyelectrolyte complex was prepared.

The nanoparticles were prepared at room temperature. About 20.0 g of a polyacrylic acid (Mw=2,000, Aldrich) aqueous solution (11,513 ppm, pH 2.76) were added drop wise to 41.0 g of a polyethylenimine (Mw=25 kDa, Aldrich) aqueous solution (1,865 ppm, pH 2.99 adjusted with HCl 1N Fisher Scientific), which was continuously stirred. After stirring for about 20 minutes, about 5.9 g of a dextran sulfate (Mw=500,000, Fisher Scientific) aqueous solution (10,032 ppm) was added, and then the resulted nanoparticles were stirred for about 10 minutes.

The nanoparticles were washed 24 hours in the dark by dialysis against a 5% w/v mannitol solution using Spectra/Por CE with MWCO 10,000. The purified, loaded nanoparticles were frozen for about two hours at −74 F before being lyophilized at 0.024 Torr and −46° C. for 24 hours. The lyophilized nanoparticles were stored in a dessicator.

The zeta potential of nanoparticles was determined by phase analysis light scattering employing a ZetaPALS instrument (Brookhaven Instrument Corp). The zeta potential before dialysis was +14.9±1.6 mV.

The mean diameter of the nanoparticles after dialysis was 116.6 nm determined by dynamic light scattering with a ZetaPALS instrument at a fixed angle of 90° and wavelength of 662 nm.

The polyacrylic acid loading efficiency was 12.98% which determined by subtracting its concentration in the supernatant from the initial concentration in the reaction media.

Example 4

Polyelectrolyte Complex Associated with a Corrosion Inhibitor (Benzyldimethyltetradecylammonium Chloride)

In this example, a composition comprising a corrosion inhibitor (benzyldimethyltetradecylammonium chloride) associated with a polyelectrolyte complex was prepared.

The nanoparticles were prepared at room temperature. About 2.2 g of a benzyldimethyltetradecylammonium chloride (Fw=368.1, Sigma) aqueous solution (10,000 ppm, pH 5.23) were added drop wise to about 60.0 g of a dextran sulfate (Mw=500 kDa, Fisher Scientific) aqueous solution (10,000 ppm, pH6.95), which was continuously stirred. After stirring for 20 minutes, about 3.0 g of a polyethylenimine (25 kDa, Aldrich) aqueous solution (9,109 ppm, pH 6.97 adjusted with HCl 1N) was added and the resultant nanoparticles were stirred for about 15 minutes.

Control nanoparticles were prepared following the same procedure substituting 2.2 g of the corrosion inhibitor by 2.2 g of deionized water. About 14.0 g of each nanoparticle's solution were centrifuged 55 minutes at 14,000 rpm to separate the supernatant (with unreacted benzyldimethyltetradecylammonium chloride) from the nanoparticles. The remaining nanoparticles solution was dialyzed 24 hours against D-mannitol 5% and 24 hours against 2.5% D-mannitol using a cellulose dialysis membrane with a MWCO 10,000. The purified, loaded nanoparticles were frozen 2 hours at −74 F before being lyophilized at 0.024 Torr and −46 C for 48 hours. Lyophilized nanoparticles were stored in a dessicator.

The mean diameter before dialysis was 268.5 nm determined by dynamic light scattering with a ZetaPALS instrument at a fixed angle of 90° and wavelength of 662 nm.

The benzyldimethyltetradecylammonium chloride loading efficiency was 44.2% determined by subtracting the concentration of the corrosion inhibitor agent in the supernatant from the initial concentration in the reaction media. The measurements were conducted at 262 nm wavelength using an Agilent 89090 UV-visible Spectrometer.

Example 5

Polyelectrolyte Complex Associated with a Gel-Breaking Enzyme (Pectinase, *Aspergillus acculeatus*)

In this example, a composition comprising a gel-breaking enzyme (pectinase) associated with a polyelectrolyte complex was prepared.

The nanoparticles were prepared at room temperature. As first step, about 1 mL of pectinase (from *Aspergillus acculeatus*, Sigma P2811) solution was diluted with 3 mL of phosphate buffer ($NaH_2PO_4$, 50 mM, pH 7). The resulting solution was dialyzed against phosphate buffer at pH 7 for 4 hours.

About 80 µL of the dialyzed pectinase solution were added to 1.6 mL of a polyethylenimine (Mw=25 kDa, Aldrich) aqueous solution (9,028 ppm, pH 6.83 adjusted with HCl 1N Fisher Scientific), which was continuously stirred at 300 rpm. After stirring for about 20 minutes, 0.8 mL of aqueous dextran sulfate (Mw=500 kDa, Fisher Scientific) solution (10,000 ppm, pH 6.87) was added, and the resulting nanoparticles were stirred by 10 minutes. About 80 µL of a zinc sulfate solution (1 M) were then added, and stirred by 5 minutes.

The nanoparticles were isolated by centrifugation at 14,000 rpm for about 45 minutes. The supernatant of the pectinase's loaded nanoparticles was decanted and saved for unreacted pectinase determination. The pellet was redispersed in phosphate buffer and centrifuged 12,000 g for about 15 minutes twice. The nanoparticle solution was frozen at −70 F overnight and lyophilized at 0.024 Torr and −46° C. for 48 hours. The lyophilized nanoparticles were stored in a dessicator.

The mean diameter of the nanoparticles was 1,678 nm determined by dynamic light scattering with a ZetaPALS instrument at a fixed angle of 90° and wavelength of 662 nm.

The loading efficiency was determined by subtracting the concentration of pectinase in the supernatant from the initial concentration in the reaction media using BCA (bicinchoninic acid), which forms a purple-blue color complex with the protein with strong absorption at 562 nm. The loading efficiency determined by UV-visible spectroscopy using this method was 83.3%.

Example 6

Polyelectrolyte Complex Associated with a Surfactant (Sodium Dodecyl Sulfate)

In this example, a composition comprising a surfactant (sodium dodecyl sulfate, SDS) associated with a polyelectrolyte complex was prepared.

The nanoparticles were prepared at room temperature. About 7.15 g of a SDS (Mw=288.38, Fluka) aqueous solution (9,979 ppm) were added drop wise to 59.6 g of a polyethylenimine (Mw=25 kDa, Aldrich) aqueous solution (9,064 ppm, pH 7.02 adjusted with HCl 1N Fisher Scientific), which was continuously stirred. After stirring for 20 minutes, about 11.12 g of a dextran sulfate (Mw=500 kDa, Fisher Scientific) aqueous solution (10,032 ppm) was added, and then the resulted nanoparticles were stirred for 10 minutes.

The nanoparticles were washed 24 hours in the dark by dialysis against a 5% w/v mannitol solution using a dialysis membrane Spectra/Por CE MWCO 10,000. The purified, loaded nanoparticles were frozen 2 hours at −74 F before being lyophilized at 0.024 Torr and −46° C. for 24 hours. Lyophilized nanoparticles were stored in a dessicator.

The zeta potential was determined by phase analysis light scattering employing a ZetaPALS instrument (Brookhaven Instrument Corp). The zeta potential of the solution before dialysis was +5.4±1.6 mV.

The mean diameter before dialysis was 54.9 nm determined by dynamic light scattering with a ZetaPALS instrument at a fixed angle of 90° and a wavelength of 662 nm.

The SDS loading efficiency of 42.2% was determined by subtracting the SDS concentration in the supernatant from the initial SDS concentration in the reaction media. The SDS concentrations were measured by conductimetric titration with Hyamine 1622.

Example 7

Chromium Entrapment in PEI/DS Nanoparticles to Delay Gelation

In oil and gas wells, the production of water from water-bearing zones can interfere with oil and gas recovery operations reducing the amount of hydrocarbons that can be recovered and increasing the water management costs. In polymer-gel water shutoff treatments polymer solutions and cross-linking agents are mixed together in order to form a gelant solution. The gelant solution is injected into a well bore, developing with time and cross-linking 3-dimensional structures that will not enter into, or flow through, porous rocks of normal permeabilities. Gelant solutions with large gelation times can penetrate deeply into the desired region, usually high water cut zones, plugging the pore channels and flow paths being the permeability of the formation effectively reduced or blocked.

In this example, the delayed viscosity increase is demonstrated using the nanoparticles loaded with chromium prepared according the Example 2. Bottle tests were conducted at 40° C. in oven using glass vials with cap (20 mL).

Samples of gelant solution were prepared adding to the 20 mL glass vial the appropriate weight of nanoparticles loaded with chromium to get 100 ppm of Cr (III) in the final solution, the appropriate weight of Alcoflood 935 (Lot #A2247BOV, average Mw=6,000 kDa) aqueous solution (10,000 ppm, 2% NaCl, 10 ppm $NaN_3$) and deionized water until get a concentration of 5,000 ppm Alcoflood 935 in the final solution. The nanoparticles and the liquid phase were hand-mixed until visual homogeneous dispersion. Duplicate gelant samples were prepared and labeled as 1A and 1B.

The control solution was prepared hand-mixing in a 20 mL glass vial 10.0 g of a 200 ppm Cr(III) (from $CrCl_3.6H_2O$, Mw=266.45, Fisher Scientific) fresh aqueous solution with 10.0 g of a 10,000 ppm Alcoflood 935 (Lot #A2247BOV, average Mw=6,000 kDa, 2% Nail, 10 ppm $NaN_3$) aqueous solution. The sample was labeled as control.

A Brookfield Digital Viscometer Model LVDV-1+CP was used to monitor the viscosity changes of gelant and control solutions and determine the gel time of the gelant solutions. The gelation process was monitored as a function of time starting from the point of visual homogeneous dispersion. The gelation time was defined as the time when the viscosity of the gel solution increases abruptly to a value greater than 205.6 cP (100% scales) at a shear rate of 11.25 $s^{-1}$. The temperature of the viscometer was controlled al 25° C. during the measurements.

Figure 3:
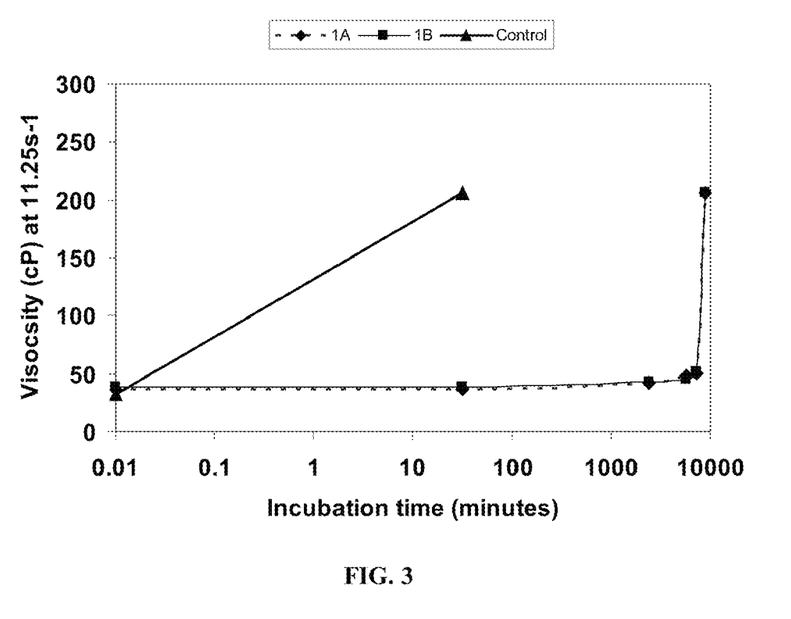
FIG. 3 shows viscosity (cP) changes at 11.25 $s^{-1}$ in function of time (minutes) for samples with 100 ppm Cr (III) in the gelant solutions. Samples 1A and 1B with Cr (III) loaded in polyethylenimine ("PEI") and DS nanoparticles. The control sample contains free inorganic Cr III) in the media. The gelation time is 280 times higher in the samples 1A and 1B than the control sample.

Table 2 and FIG. 3 show viscosity (cP) changes at 11.25 $s^{-1}$ in function of time (minutes) for the evaluated samples.

TABLE 2

| Sample | Viscosity, cP, t = 0 min | Viscosity, cP t = 32 min | Viscosity, cP t = 4,320 min | Viscosity, cP t = 5,760 min | Viscosity, cP t = 7,200 min | Viscosity, cP t = 9,000 min |
|---|---|---|---|---|---|---|
| Control | 32.5 | >205.6 | | | | |
| 1A | 37.0 | 37.0 | 41.7 | 48.8 | 50.9 | >205.6 |
| 1B | 38.8 | 38.8 | 42.7 | 45.8 | 51.5 | >205.6 |

The control sample has a gelation time of about 32 minutes. In this case, the chromium (III) cations presents in the media react by a ligand-exchange reaction with the, or hydrolyzed, groups in the Alcoflood polymer to form crosslinks producing a network or gel in relatively short gelation time. The gelation time of the samples 1A and 1B was the same (about 9,000 minutes) as well as the viscosity increase behavior. The gelation time of 1A and 1B samples compared to the control is about 280 times higher.

These results demonstrate the delayed viscosity increase and delayed gelation produced by the loading of Cr (III) with polyethylenimine and dextran sulfate in a polyelectrolyte complex.

From the foregoing it will be seen that this invention is one well adapted to attain all ends and objectives herein-above set forth, together with the other advantages which are obvious and which are inherent to the invention. Since many possible embodiments may be made of the invention without departing from the scope thereof, it is to be understood that all matters herein set forth or shown in the accompanying drawings are to be interpreted as illustrative, and not in a limiting sense. Further, while specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A method for controlling or delaying the release of an oil and gas field chemical comprising:

providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;

wherein said oil and gas field chemical is selected from the group consisting of a scale inhibitor; and wherein said scale inhibitor is selected from the group consisting of aliphatic phosphonic acids, aminoalkyl phosphonic acids, polycarboxylic acids selected from the group consisting of acrylic acid, maleic acid, lactic acid and tartaric acids, and polymeric anionic compounds; polyvinyl sulphonic acid and poly(meth)acrylic acids; hexamethylene diamine tetrakis (methylene phosphonic acid), diethylene triamine tetra (methylene phosphonic acid), diethylene triamine penta (methylene phosphonic acid), bis-hexamethylene triamine pentakis (methylene phosphonic acid), polyacrylic acid, phosphino carboxylic acid, diglycol amine phosphonate, 1-hydroxyethylidene 1,1-diphosphonate, and bisaminoethylether phosphonate; and their alkali metal salts;

introducing said polyelectrolyte complex associated with said oil and gas field chemical into an oil and gas well.

2. The method of claim 1 wherein said polycation is selected from the group consisting of chitosan, polyethylenimine, poly-L-lysine and said polyanion comprises dextran sulfate.

3. The method of claim 1 further comprising a monovalent or bivalent cation selected from the group consisting of sodium ion or calcium ion.

4. The method of claim 1 further comprising an anion selected from the group consisting of triphosphate ion, chloride ion, or sulfate ion.

5. The method of claim 1 wherein said oil and gas field chemical is a scale inhibitor comprising polyacrylic acid.

6. The method of claim 1 wherein said polyelectrolyte complex is a nanoparticle with a particle size of about 100 to 300 nm in diameter.

7. The method of claim 1 wherein said providing step comprises
mixing said polyanion, said polycation, and said oil and gas field chemical together in solution;
ceasing mixing to form said polyelectrolyte complex comprising said polyanion and said polycation and said oil and gas field chemical associated with said polyelectrolyte complex.

8. The method of claim 7 wherein said polyanion and polycation are first mixed together separately prior to adding said oil and gas field chemical.

9. The method of claim 7 wherein said polycation and oil and gas field chemical are first mixed together separately prior to adding said polyanion.

10. The method of claim 7 wherein said polyanion and oil and gas field chemical are first mixed together separately prior to adding said polycation.

11. The method of claim 7 further comprising dialyzing said polyelectrolyte complex solution to isolate a polyelectrolyte nanoparticle having said oil and gas field chemical associated therewith.

12. The method of claim 1 wherein said polyelectrolyte complex is a nanoparticle with a particle size of about 50 to 500 nm.

13. The method of claim 7 wherein said polyelectrolyte complex is a nanoparticle with a particle size of about 100 to 300 nm.

14. The method of claim 1 wherein said oil and gas field chemical is a scale inhibitor which is selected from the group consisting of aliphatic phosphonic acids, aminoalkyl phosphonic acids, polycarboxylic acids selected from the group consisting of acrylic acid, maleic acid, lactic acid and tartaric acids, and polymeric anionic compounds.

15. The method of claim 1 wherein said scale inhibitor is selected from the group consisting of polyvinyl sulphonic acid and poly(meth)acrylic acids and their alkali metal salts.

16. The method of claim 1 wherein said scale inhibitor is selected from the group consisting of hexamethylene diamine tetrakis (methylene phosphonic acid), diethylene triamine tetra (methylene phosphonic acid), diethylene triamine penta (methylene phosphonic acid), bis-hexamethylene triamine pentakis (methylene phosphonic acid), polyacrylic acid, phosphino carboxylic acid, diglycol amine phosphonate, 1-hydroxyethylidene 1,1-diphosphonate, bisaminoethylether phosphonate and their alkali metal salts.

17. The method of claim 1 wherein said polyanion has a sulfate or sulfonate group.

18. A method for controlling or delaying the release of an oil and gas field chemical comprising:
providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is a corrosion inhibitor comprising benzyldimethyltetradecylammonium chloride;
and
introducing said polyelectrolyte complex associated with said oil and gas field chemical into an oil and gas well.

19. A method for controlling or delaying the release of an oil and gas field chemical comprising:
providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is a cross-linking agent comprising a chromium-containing compound;
and
introducing said polyelectrolyte complex associated with said oil and gas field chemical into an oil and gas well.

20. The method of claim 19 wherein said oil and gas field chemical is a chromium compound selected from the group consisting of chromium nitrate, chromium chloride, chromium citrate, chromium acetate, and chromium propionate.

21. The method of claim 19 wherein said providing step comprises
mixing said polyanion, said polycation, and said oil and gas field chemical together in solution;
ceasing mixing to form said polyelectrolyte complex comprising said polyanion and said polycation and said oil and gas field chemical associated with said polyelectrolyte complex.

22. The method of claim 21 wherein said polyanion and polycation are first mixed together separately prior to adding said oil and gas field chemical.

23. The method of claim 21 wherein said polycation and oil and gas field chemical are first mixed together separately prior to adding said polyanion.

24. The method of claim 21 wherein said polyanion and oil and gas field chemical are first mixed together separately prior to adding said polycation.

25. The method of claim 21 further comprising dialyzing said polyelectrolyte complex solution to isolate a polyelectrolyte nanoparticle having said oil and gas field chemical associated therewith.

26. The method of claim 19 wherein said polyelectrolyte complex is a nanoparticle with a particle size of about 50 to 500 nm.

27. The method of claim 19 wherein said polyelectrolyte complex is a nanoparticle with a particle size of about 100 to 300 nm.

28. The method of claim 19 wherein said polyanion has a sulfate or sulfonate group.

29. A method for controlling or delaying the release of an oil and gas field chemical comprising:
providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is an inhibitor of asphaltene or wax deposition;
and
introducing said polyelectrolyte complex associated with said oil and gas field chemical into an oil and gas well.

30. The method of claim 29 wherein said inhibitor of asphaltene or wax deposition is an amphoteric fatty acid or a salt of an alkyl succinate.

31. The method of claim 29 wherein said inhibitor of asphaltene or wax deposition is an olefin polymer.

32. The method of claim 29 wherein said inhibitor of asphaltene or wax deposition is a copolymeric ester.

33. The method of claim 29 wherein said inhibitor of asphaltene or wax deposition is ethylene-vinyl acetate copolymer.

34. The method of claim 29 wherein said providing step comprises
mixing said polyanion, said polycation, and said oil and gas field chemical together in solution;
ceasing mixing to form said polyelectrolyte complex comprising said polyanion and said polycation and said oil and gas field chemical associated with said polyelectrolyte complex.

35. The method of claim 34 wherein said polyanion and polycation are first mixed together separately prior to adding said oil and gas field chemical.

36. The method of claim 34 wherein said polycation and oil and gas field chemical are first mixed together separately prior to adding said polyanion.

37. The method of claim 34 wherein said polyanion and oil and gas field chemical are first mixed together separately prior to adding said polycation.

38. The method of claim 34 further comprising dialyzing said polyelectrolyte complex solution to isolate a polyelectrolyte nanoparticle having said oil and gas field chemical associated therewith.

39. The method of claim 29 wherein said polyelectrolyte complex is a nanoparticle with a particle size of about 50 to 500 nm.

40. The method of claim 29 wherein said polyelectrolyte complex is a nanoparticle with a particle size of about 100 to 300 nm.

41. The method of claim 29 wherein said polyanion has a sulfate or sulfonate group.

42. A method for controlling or delaying the release of an oil and gas field chemical comprising:
providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is a hydrate inhibitor;
and
introducing said polyelectrolyte complex associated with said oil and gas field chemical into an oil and gas well.

43. The method of claim 42 wherein said providing step comprises
mixing said polyanion, said polycation, and said oil and gas field chemical together in solution;
ceasing mixing to form said polyelectrolyte complex comprising said polyanion and said polycation and said oil and gas field chemical associated with said polyelectrolyte complex.

44. The method of claim 43 wherein said polyanion and polycation are first mixed together separately prior to adding said oil and gas field chemical.

45. The method of claim 43 wherein said polycation and oil and gas field chemical are first mixed together separately prior to adding said polyanion.

46. The method of claim 43 wherein said polyanion and oil and gas field chemical are first mixed together separately prior to adding said polycation.

47. The method of claim 43 further comprising dialyzing said polyelectrolyte complex solution to isolate a polyelectrolyte nanoparticle having said oil and gas field chemical associated therewith.

48. The method of claim 42 wherein said polyelectrolyte complex is a nanoparticle with a particle size of about 50 to 500 nm.

49. The method of claim 42 wherein said polyelectrolyte complex is a nanoparticle with a particle size of about 100 to 300 nm.

50. The method of claim 42 wherein said polyanion has a sulfate or sulfonate group.

51. A method for controlling or delaying the release of an oil and gas field chemical comprising:
providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is a surfactant;
and
introducing said polyelectrolyte complex associated with said oil and gas field chemical into an oil and gas well.

52. The method of claim 51 wherein said oil and gas field chemical is a surfactant comprising sodium dodecyl sulfate.

53. The method of claim 51 wherein said surfactant contains a carboxylate, sulfonate, or sulfate ion.

54. The method of claim 51 wherein said surfactant is a sodium, potassium, or ammonium alkyl sulfonate or alkyl aryl sulfonate.

55. The method of claim 51 wherein said surfactant is selected from the group consisting of sodium dodecylbenzene sulfonate, dialkyl sodium sulfosuccinates, dialkyl sodium sulfosuccinates, and alkyl sulfates.

56. The method of claim 51 wherein said surfactant is selected from the group consisting of benzalkonium chloride, benzethonium chloride, cetrimonium bromide, stearyl dimethylbenzyl ammonium chloride, polyoxyethylene, and coconut amine.

57. The method of claim 51 wherein said surfactant is selected from the group consisting of ethylene glycol monostearate, propylene glycol myristate, glyceryl monostearate, glyceryl stearate, polyglyceryl-4-oleate, sorbitan acylate, sucrose acylate, PEG-150 laurate, PEG-400 monolaurate, polyoxyethylene monolaurate, polysorbates, polyoxyethylene octylphenylether, PEG-1000 cetyl ether, polyoxyethylene tridecyl ether, polypropylene glycol butyl ether, stearoyl monoisopropanolamide, and polyoxyethylene hydrogenated tallow amide.

58. The method of claim 51 wherein said surfactant is selected from the group consisting of sodium N-dodecyl-beta-alanine, sodium N-lauryl-beta-iminodipropionate, myristoamphoacetate, lauryl betaine, and lauryl sulfobetaine.

59. The method of claim 51 wherein said providing step comprises
mixing said polyanion, said polycation, and said oil and gas field chemical together in solution;
ceasing mixing to form said polyelectrolyte complex comprising said polyanion and said polycation and said oil and gas field chemical associated with said polyelectrolyte complex.

60. The method of claim 59 wherein said polyanion and polycation are first mixed together separately prior to adding said oil and gas field chemical.

61. The method of claim 59 wherein said polycation and oil and gas field chemical are first mixed together separately prior to adding said polyanion.

62. The method of claim 59 wherein said polyanion and oil and gas field chemical are first mixed together separately prior to adding said polycation.

63. The method of claim 59 further comprising dialyzing said polyelectrolyte complex solution to isolate a polyelectrolyte nanoparticle having said oil and gas field chemical associated therewith.

64. The method of claim 51 wherein said polyelectrolyte complex is a nanoparticle with a particle size of about 50 to 500 nm.

65. The method of claim 51 wherein said polyelectrolyte complex is a nanoparticle with a particle size of about 100 to 300 nm.

66. The method of claim 51 wherein said polyanion has a sulfate or sulfonate group.

67. A method for controlling or delaying the release of an oil and gas field chemical comprising:
providing a polyelectrolyte complex comprising a polyanion and a polycation, said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is a cross-linking agent comprising a zirconium-containing compound selected from the group consisting of zirconium citrate, zirconium tetrachloride, zirconium oxychloride, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis(triethanolamine)zirconate, zirconium carbonate, ammonium zirconium carbonate, zirconyl ammonium carbonate, and zirconium lactate or a titanium-containing compound selected from the group consisting of titanium acetylacetonate, titanium ethylacetoacetate, titanium citrate, titanium triethanolamine, and ammonium titanium lactate;
and
introducing said polyelectrolyte complex associated with said oil and gas field chemical into an oil and gas well.

68. The method of claim 67 wherein said oil and gas field chemical is a zirconium-containing compound selected from the group consisting of zirconium citrate, zirconium tetrachloride, zirconium oxychloride, zirconium complex of hydroxyethyl glycine, ammonium zirconium fluoride, zirconium 2-ethylhexanoate, zirconium acetate, zirconium tartarate, zirconium malonate, zirconium propionate, zirconium neodecanoate, zirconium acetylacetonate, tetrakis(triethanolamine)zirconate, zirconium carbonate, ammonium zirconium carbonate, zirconyl ammonium carbonate, and zirconium lactate.

69. The method of claim 67 wherein said oil and gas field chemical is a titanium-containing compound selected from the group consisting of titanium acetylacetonate, titanium ethylacetoacetate, titanium citrate, titanium triethanolamine, and ammonium titanium lactate.

70. The method of claim 67 wherein said providing step comprises
mixing said polyanion, said polycation, and said oil and gas field chemical together in solution;
ceasing mixing to form said polyelectrolyte complex comprising said polyanion and said polycation and said oil and gas field chemical associated with said polyelectrolyte complex.

71. The method of claim 70 wherein said polyanion and polycation are first mixed together separately prior to adding said oil and gas field chemical.

72. The method of claim 70 wherein said polycation and oil and gas field chemical are first mixed together separately prior to adding said-polyanion.

73. The method of claim 70 wherein said polyanion and oil and gas field chemical are first mixed together separately prior to adding said polycation.

74. The method of claim 67 wherein said polyelectrolyte complex is a nanoparticle with a particle size of about 50 to 500 nm.

75. The method of claim 67 wherein said polyelectrolyte complex is a nanoparticle with a particle size of about 100 to 300 nm.

76. The method of claim 67 wherein said polyanion has a sulfate or sulfonate group.

77. A method for controlling or delaying the release of an oil and gas field chemical comprising:
providing a polyelectrolyte complex comprising a polyanion and a polycation, wherein said providing comprises mixing said polyanion, said polycation, and said oil and gas field chemical together in solution; ceasing mixing to form said polyelectrolyte complex comprising said polyanion and said polycation and said oil and gas field chemical associated with said polyelectrolyte complex; and dialyzing said polyelectrolyte complex solution to isolate a polyelectrolyte nanoparticle having said oil and gas field chemical associated therewith;
said polyelectrolyte complex having a polymeric core and polymeric shell, said polyelectrolyte complex associated with said oil and gas field chemical; and wherein said polyelectrolyte complex is a nanoparticle having a particle size less than about 5000 nm;
wherein said oil and gas field chemical is a cross-linking agent comprising a zirconium-containing, aluminum-containing, or titanium-containing compound;
and
introducing said polyelectrolyte complex associated with said oil and gas field chemical into an oil and gas well.

* * * * *